(12) United States Patent
Feltham et al.

(10) Patent No.: US 9,313,031 B2
(45) Date of Patent: *Apr. 12, 2016

(54) TELEPHONE CALLER AUTHENTICATION

(71) Applicant: International Business Machines Corporation, Armonk, NY (US)

(72) Inventors: Andrew S. Feltham, Chandlers Ford (GB); Elizabeth J. Maple, Hursley Park (GB); Simon J. Maple, Basingstoke (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,145

(22) Filed: Jul. 21, 2014

(65) Prior Publication Data

US 2015/0236857 A1    Aug. 20, 2015

Related U.S. Application Data

(63) Continuation of application No. 14/184,775, filed on Feb. 20, 2014.

(51) Int. Cl.
*H04M 1/56* (2006.01)
*H04M 15/06* (2006.01)
(Continued)

(52) U.S. Cl.
CPC .......... *H04L 9/3263* (2013.01); *H04L 63/0414* (2013.01); *H04L 63/0823* (2013.01); *H04L 63/18* (2013.01); *H04M 3/38* (2013.01); *H04Q 3/72* (2013.01); *H04W 4/16* (2013.01); *H04W12/04* (2013.01); *H04W 12/06* (2013.01); *H04L 2209/24* (2013.01); *H04L 2209/64* (2013.01)

(58) Field of Classification Search
CPC ... H04M 1/57; H04M 3/42059; H04M 3/436; H04M 1/575; H04M 1/578; H04L 63/20; H04L 2463/101; H04L 2463/102
USPC ............ 379/142.01, 142.05, 142.06; 455/415
See application file for complete search history.

(56) References Cited

U.S. PATENT DOCUMENTS

| 6,553,110 | B1 | 4/2003 | Peng |
| 7,003,466 | B2 | 2/2006 | Brown et al. |

(Continued)

FOREIGN PATENT DOCUMENTS

| WO | 2010/144737 A2 | 12/2010 |
| WO | WO2011154221 A1 | 12/2011 |

*Primary Examiner* — Quoc D Tran
(74) *Attorney, Agent, or Firm* — John R. Pivnichny; Gregory K. Goshorn; Greg Goshorn, P.C.

(57) ABSTRACT

Techniques for authenticating the identity of a caller in a telephone call are disclosed. The device generating the call implements encrypting caller identification information and initiating the telephone call, said initiating comprising providing a voice carrier signal including the caller identification information; and simultaneously providing a data carrier signal including the encrypted caller identification information. The receiving device implements receiving the telephone call; decrypting the encrypted caller identification information at the recipient device; and verifying the identity of at least an unknown caller at the recipient device by at least one of verifying the authenticity of a certificate used to encrypt the caller identification information; and comparing the decrypted caller identification information with the caller identification information from the voice carrier signal. A telephony device implementing such an authentication technique is also disclosed.

7 Claims, 4 Drawing Sheets

(51) Int. Cl.
*H04L 9/32* (2006.01)
*H04W 12/04* (2009.01)
*H04W 12/06* (2009.01)
*H04W 4/16* (2009.01)
*H04Q 3/72* (2006.01)
*H04M 3/38* (2006.01)
*H04L 29/06* (2006.01)

(56) References Cited

U.S. PATENT DOCUMENTS

| | | |
|---|---|---|
| 7,006,605 B1 | 2/2006 | Morganstein et al. |
| 7,103,172 B2 | 9/2006 | Brown et al. |
| 8,290,130 B2 * | 10/2012 | Cheon et al. .............. 379/142.05 |
| 8,320,540 B2 | 11/2012 | Chen |
| 8,817,961 B1 * | 8/2014 | Sterman .................... 379/142.05 |
| 9,060,057 B1 * | 6/2015 | Danis |
| 2006/0262929 A1 * | 11/2006 | Vatanen et al. ................ 380/255 |
| 2007/0118750 A1 | 5/2007 | Owen et al. |
| 2007/0121583 A1 | 5/2007 | Wing |
| 2008/0181379 A1 | 7/2008 | Chow et al. |
| 2008/0187119 A1 * | 8/2008 | Vinokurov et al. ....... 379/142.05 |
| 2009/0270073 A1 | 10/2009 | Ling et al. |
| 2011/0026699 A1 | 2/2011 | Amir et al. |
| 2011/0072499 A1 | 3/2011 | Lin |
| 2014/0187203 A1 * | 7/2014 | Bombacino et al. ........... 455/411 |

* cited by examiner

TELEPHONE CALLER AUTHENTICATION

CROSS-REFERENCES TO RELATED APPLICATIONS

The present application is a continuation and claims the benefit of the filing date of an application entitled, "Telephone Caller Authentication" Ser. No. 14/184,775, filed Feb. 20, 2014, assigned to the assignee of the present application, and herein incorporated by reference

FIELD OF THE INVENTION

The present invention relates to techniques fir authenticating the identity of a caller in a telephone call between a caller device and a recipient device, comprising including caller identification information in a voice carrier signal from the caller device.

BACKGROUND

In modern society, many financial transactions are now performed electronically, e.g. using credit or debit cards, by performing transactions over the Internet and/or by using mobile telephony protocols to name but a few examples. The authenticity of such transactions is typically ensured by the use of some verification data that can only be known to the user, e.g. (selected characters from) passwords and so on.

Nevertheless, such transactions can be sensitive to fraud, e.g. because credit or debit card details have been stolen or because the security of user authentication information has been compromised. Fortunately, many financial institutions, e.g. banks, perform rigorous security checks on most financial transactions, and contact a customer in case a particular transaction cannot be trusted. Such contact is typically performed by telephone, with the call being initiated by an employee of the financial institution asking the customer to divulge details of the customer's security information in order to verify the identity of the customer.

However, such contact itself is susceptible to fraud. A customer may be contacted maliciously over the telephone by a caller posing as an employee of a financial institution in order to obtain the security details of the customer with the intention to defraud the customer by engaging in financial transactions using the customer's funds. It can be very difficult to detect such malicious calls. The caller ID may be withheld, or may be fraudulently altered (spoofed). Although a vigilant customer may verify the identity of the caller by requesting a phone number that the customer can call back and subsequently contact the financial institution to verify if the provided phone number can be trusted, this is rather cumbersome and does not avoid the risk of a customer erroneously trusting the identity of a malicious caller.

Attempts have been made to facilitate the recipient of a call to establish the authenticity of the caller, for instance, a service that handles incoming telephone calls without bothering the telephone subscriber. The service permits a call to go through to a subscriber if the service determines that the call is not unwanted and the caller has been unauthenticated. The authentication is based on challenging the caller to prove its identity rather than relying on caller ID displays. Prospective callers pre-register with the service providing caller account information. When a caller is issued a challenge, the caller may prove its authenticity by supplying the challenge back to the service along with its registered information. Although this service avoids a subscriber being subjected to unwanted and fraudulent calls, a disadvantage of this approach is that it requires active implementation by a service provider and several process steps before a caller can be connected to a subscriber.

BRIEF SUMMARY OF THE INVENTION

The claimed subject matter seeks to provide a more straightforward techniques for authenticating the identity of a caller in a telephone call between a caller device and a recipient device. The claimed subject matter further seeks to provide a telephony device that can implement at least certain aspects of this method.

According to an aspect of the claimed subject matter, there is provided techniques for providing caller identification information in a telephone call, comprising encrypting caller identification information; initiating the telephone call, said initiating comprising: providing a voice carrier signal including the caller identification information; and simultaneously providing a data carrier signal including the encrypted caller identification information.

These techniques allow a recipient of such a call to authenticate the identity of the caller by comparison of the encrypted caller identification information provided in the data carrier signal, e.g. in the form of a message, with the unencrypted caller identification information provided in the voice carrier signal, thus facilitating a straightforward caller identification authentication method does not require service provider intervention.

In a one embodiment, the caller identification information is encrypted using a private key.

According to another aspect of the claimed subject matter there is provided techniques for authenticating the identity of a caller in a telephone call between a caller device and a recipient device, comprising receiving a telephone call initiated by a caller device in accordance with the aforementioned method of providing caller identification information in a telephone call; decrypting the encrypted caller identification information at the recipient device; and verifying the identity of at least an unknown caller at the recipient device by at least one of verifying the authenticity of a certificate used to encrypt the caller identification information; and comparing the decrypted caller identification information with the caller identification information from the voice carrier signal. The claimed subject matter utilizes the principle that in telephone calls, voice and data carrier signals can be communicated simultaneously.

By encrypting a caller ID at the caller's end, e.g. using a private key, including this encrypted caller ID in the digital data carrier signal, e.g. as a message, and decrypting the encrypted caller ID at the recipient's end, e.g. using a public key and comparing the decrypted caller ID with the caller ID in the voice carrier signal, a recipient of a phone call can verify the identity of a caller without the caller requiring some form of subscription and authentication with a service provider, thus simplifying the authentication process without sacrificing robustness of the verification process.

The authenticity of the caller may additionally or instead be established by verifying the authenticity of a certificate used to encrypt the caller identification information in the recipient device. This embodiment further increases the robustness of the authentication method of the present invention, as the call may be considered unauthenticated even if the caller IDs in the voice and data streams appear to match. It is noted that the verification of the authenticity of such digital certificates is well-known.

In a one embodiment, a technique further comprises generating a warning message on the recipient device if the authenticity of the caller cannot be verified, e.g. in the form of an audible (warning) signal, a visual (warning) signal or as a (warning) message on a display of the recipient device to warn the user that the call cannot be trusted, which information can be aid the user in deciding whether to terminate the call. In an alternative embodiment, in a scenario where the authenticity of said certificate cannot be verified and/or where decrypted caller identification information does not match the caller identification information in the voice carrier signal, the method may further comprise automatically terminating the call by the recipient device such that the user is not at risk of divulging sensitive information.

In an embodiment, the comparing the decrypted caller identification information with the caller identification information from the voice carrier signal is performed prior to the call being answered by a user of the recipient device.

In another embodiment, the comparing the decrypted caller identification information with the caller identification information from the voice carrier signal is performed after the call being answered by as user of the recipient device.

According to another aspect of the claimed subject matter, there is provided a computer program product comprising a computer-readable storage medium, said medium comprising computer program code for implementing the steps of an embodiment of the method of the present invention when executed on a processor of a telephony device. This inter alia has the advantage that existing telephony devices, e.g. 3G or 4G mobile phones, may be retrofitted with an embodiment of the method of the present invention.

According to yet another aspect of the claimed subject matter, there is provided a telephony device comprising a processor adapted to simultaneously transmit and/or simultaneously receive a voice carrier signal and a digital data carrier signal, wherein the processor is further adapted to perform at least one of: (a) encrypting caller identification information identifying the telephony device; and simultaneously transmitting a voice carrier signal including the unencrypted caller identification information and a digital data carrier signal including the encrypted caller identification information; and (b) verify the identity of at least an unknown caller at the recipient device by decrypting the encrypted caller identification information and performing at least one of verifying the authenticity of a certificate used to encrypt the caller identification information; and comparing the decrypted caller identification information with the caller identification information from the voice carrier signal. Such a telephony device provides a more robust protection against fraudulent telephone calls, as a secure identification of the identity of the caller can be provided and/or detected using such a telephony device.

In an embodiment, the processor is adapted to perform both steps (a) and (b).

In one embodiment, the processor is adapted to encrypt the caller identification information using a private key; and/or decrypt the encrypted caller identification information using a public key.

The processor may be further adapted to generate a warning message on the recipient device if the authenticity of the caller cannot be verified, thereby allowing the user to decide whether to proceed with the call, e.g. by providing the user with some warning signal, or instead terminate the call.

Alternatively, the processor may be further adapted to automatically terminate a call if the decrypted caller identification information does not match the caller identification information in the received voice carrier signal and/or if a certificate of the encrypted caller identification information cannot be verified.

BRIEF DESCRIPTION OF THE DRAWINGS

Preferred embodiments of the present invention will now be described, by way of example only, with reference to the following drawings, in which.

DETAILED DESCRIPTION

Figure 1:
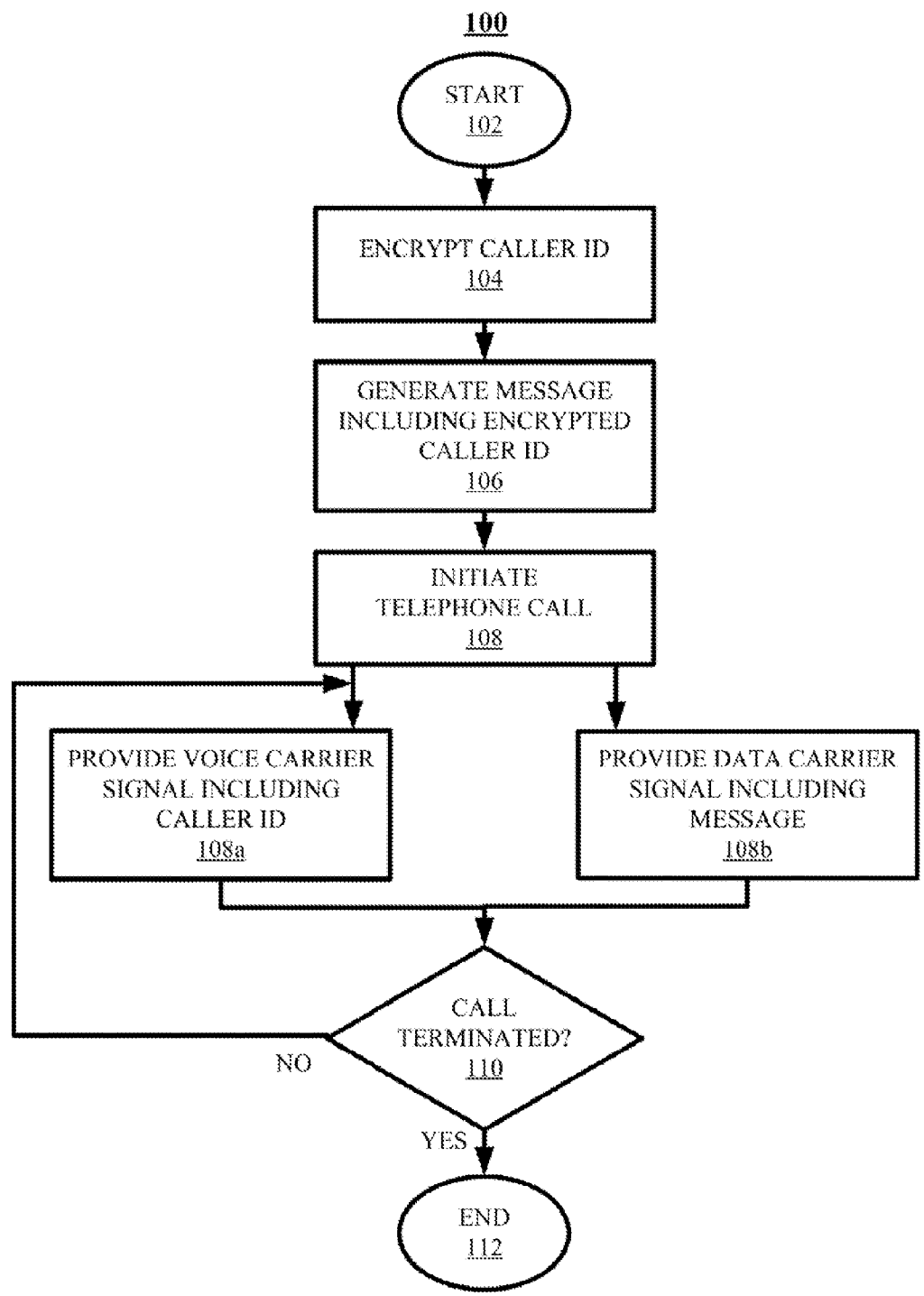
FIG. 1 depicts a flow chart of an embodiment of a technique to generate a telephone call that allows the recipient of the call to verify the identity of the caller.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The various embodiments of the methods of the present invention may be stored in the form of computer program code on a computer program product comprising a computer-readable storage medium. The computer-readable storage medium may be any medium that can be accessed by a computer for the retrieval of digital data from said medium. Non-limiting examples of a computer-readable storage medium include a CD, DVD, flash memory card, a USB memory stick, a random access memory, a read-only memory, a computer hard disk, a storage area network, a network server, an Internet server and so on. The computer program code may be executed by at least one processor of a telephony device to implement the steps of a particular embodiment of the methods of the present invention.

FIG. 1 depicts a flow chart of an embodiment of a method 100 of the present invention for providing caller identification information in a telephone call. The method 100 starts in step 102, after which caller identification information, e.g. a caller ID such as the telephone number associated with the caller device is encrypted in any suitable manner, e.g. using a private encryption key, in step 104. The encrypted caller identification information may optionally be incorporated in a message in step 106. As it is well-known per se how to encrypt information such as the caller identification information, this will not be explained in further detail for the sake of brevity only.

Next, the telephone call is initiated in step 108, which comprises the sub-steps of generating a voice carrier signal including the caller identification information in step 108a and generating a data carrier signal including the encrypted caller identification information in step 108b, e.g. in the form of a message. The sub-steps 108a and 108b are typically performed simultaneously. The signals are transmitted to the targeted recipient device of the initiated phone call as is well-known per se. For instance, the concept of simultaneous voice and data transmission is readily available in mobile communication standards such as 3G and 4G standards as previously mentioned.

Upon the call being answered, the method may continue to provide the voice carrier signal until the call is terminated as checked in step 110, after which the method ends in step 112. It is pointed out for the avoidance of doubt that the continued provision of the voice carrier signal does not imply that the caller identification information is continuously present in this signal. Typically, the caller identification information is only present in the voice carrier signal during initiation of the call, e.g. between the first and second rings, as is well-known per se.

Figure 2:
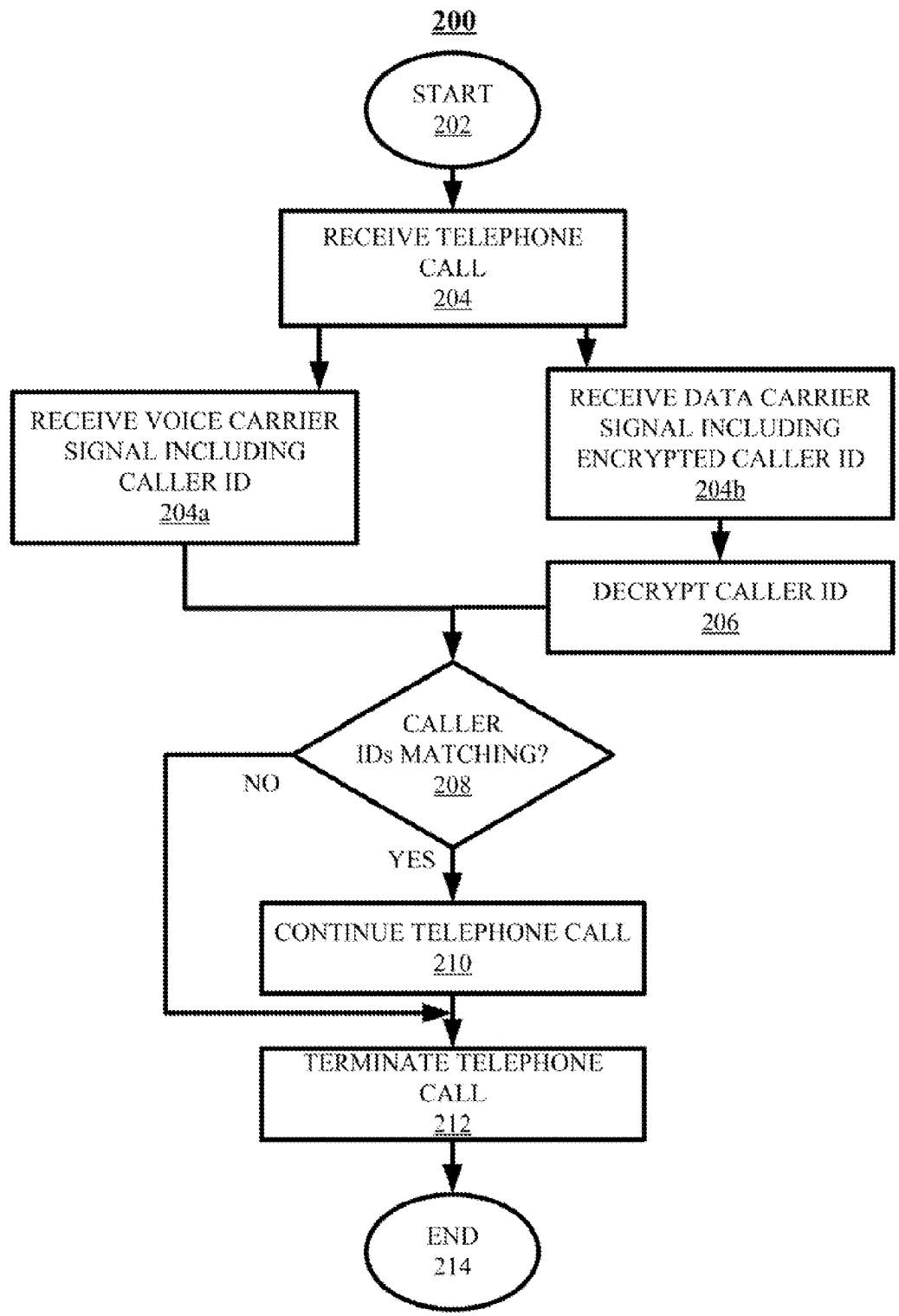
FIG. 2 depicts a flow chart of one embodiment of the claimed subject matter.

The unencrypted caller identification information in the voice carrier signal and the encrypted caller identification information in the data carrier signal may be processed by a recipient device of the phone call in order to authenticate the identity of the caller. An embodiment of such an authentication technique is shown in FIG. 2. A process 200 starts in a block 202, after which process 200 proceeds to a block 204 in which the telephone call initiated in accordance with the technique as shown in FIG. 1 is received in a block 204. To this end, the recipient telephony device should be capable of simultaneously receiving a voice carrier signal and a data carrier signal. A non-limiting example of a suitable recipient telephony device is a device compatible with 3G and/or 4G communication standards, e.g. a mobile phone, a smart phone, a tablet device and so on.

Block 204 comprises a sub-block 204a in which the recipient device receives the voice carrier signal including the caller identification information and a sub-block 204b in which the recipient device receives the data carrier signal including the encrypted caller identification information. These sub-blocks may be performed simultaneously, as previously explained. In a block 206, the recipient device extracts the encrypted caller identification information from the data carrier signal and decrypts the encrypted caller identification information, e.g. using a public key provided by the caller. Such a public key may be stored on the recipient device in any suitable manner.

In a block 208, the decrypted caller identification information is compared with the caller identification information from the voice carrier signal. If the caller identification information from the different signals does not match, e.g. different caller IDs are detected or no encrypted caller identification information could be found in the data carrier signal, the recipient device may conclude that the identity of the caller cannot be verified, in which case process 200 may proceed to a block 212 in which the call is automatically terminated. On the other hand, in case of matching caller identification information, the caller can be trusted, i.e. his identity has been verified, process 200 may proceed to a block 210 by allowing the telephone call to continue until the user of the recipient device terminates the call in a block 212, after which process 200 terminates in a block 214.

In an embodiment, blocks 206 and 208 are performed prior to the user answering the call, such that the call may be terminated without exposing the user to a potentially fraudulent caller. Alternatively, blocks 206 and 208 may be performed after the user has answered the call. This for instance avoids the risk of a call from a genuine caller being refused because for some reason the genuine caller is incapable of providing the correct encryption information. In this embodiment, it may also be desirable to avoid automatic termination of the call by the recipient device and instead prompt a user that no successful authentication of the caller could be achieved, in which case the user may decide to terminate the call instead. This will be explained in more detail with the aid of FIG. 3.

Another advantageous variation to the technique of FIG. 2 is that decryption block 206 may include a verification of the authenticity of the certificate used to encrypt the caller identification information in the voice carrier signal. This for instance can be used to detect if the encrypted caller identification information has been forged, thus avoiding the risk that a caller may be falsely trusted due to matching caller identification information in the voice and data carrier signals. In this embodiment, block 208 may be omitted altogether if it is determined that the certificate used to encrypt the caller identification information in the voice carrier signal cannot be verified or otherwise trusted, in which case the call may be immediately terminated in block 212 or the user alternatively may be prompted that the identity of the caller could not be verified.

Figure 3:
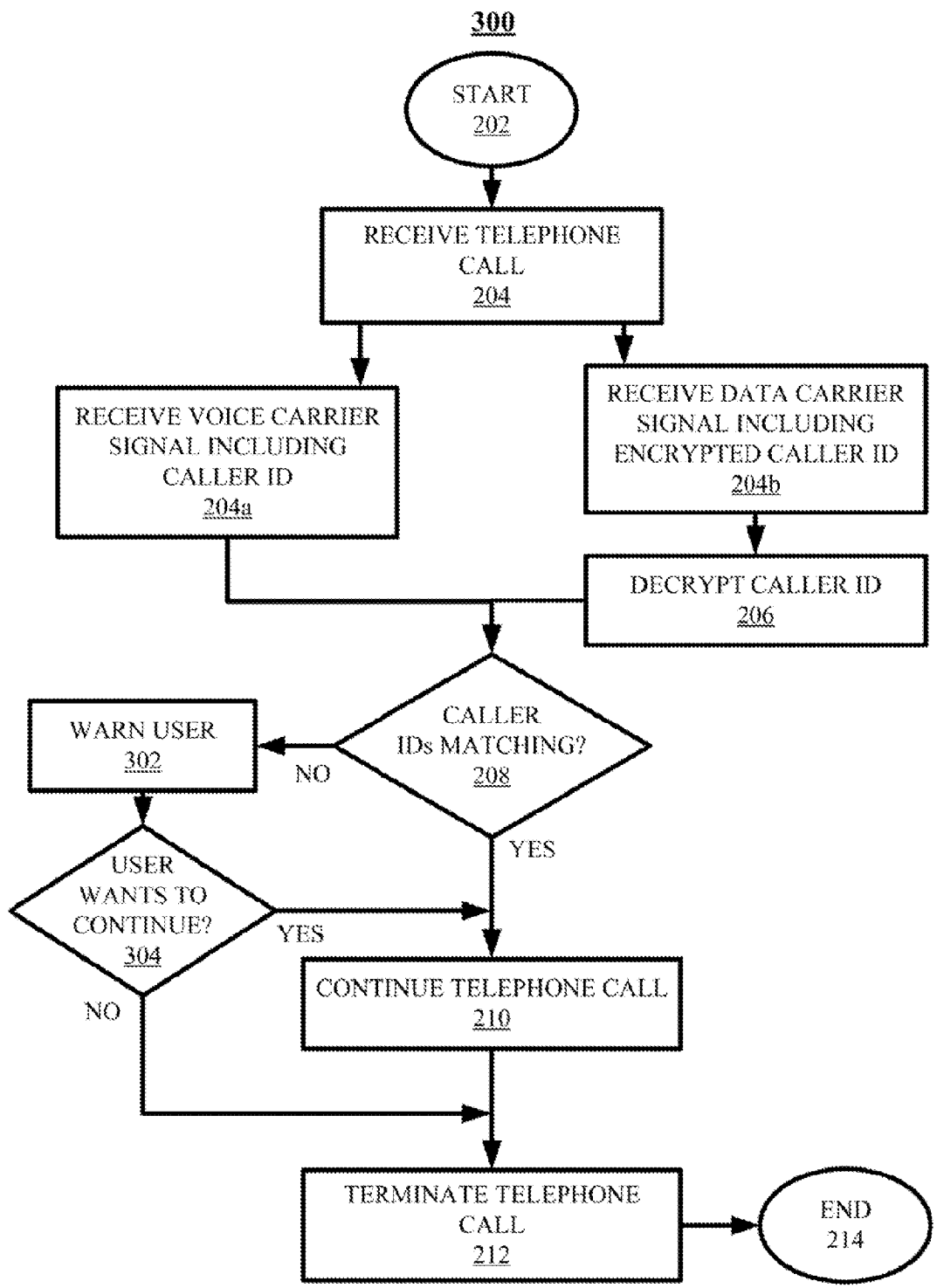
FIG. 3 depicts a flow chart of another embodiment of the claimed subject matter.

FIG. 3 depicts an embodiment of an authentication method in which the user is responsible for terminating the call upon a caller authentication failure. A process 300 comprises the same blocks as process 200 in FIG. 2, such that the blocks that have already been described in the detailed description of FIG. 2 will not be described again for the sake of brevity only. FIG. 3 differs from FIG. 2 in that in case of non-matching caller identification information as determined in block 208 (or the detection of an unverified certificate used to generate the encrypted caller identification information in the voice carrier signal in block 206 as previously explained), process 300 proceeds to a block 302 in which the user is warned that the identity of the caller could not be authenticated.

Such a warning may be provided in any suitable form. For instance, the warning may be an audible warning signal, such as a change in ring tone prior to the user answering the call or a warning sound generated after the user has answered the call, a visual signal such as flashing light or display or a warning message on the display of the recipient device, a sensory warning signal such as a vibration pattern, and so on.

Upon being confronted with such a warning signal, the user may decide whether or not to continue with the call in a block 304. The user may for instance want to continue the call because the user has reason to trust the caller anyway, e.g. because the call was expected, because the user recognizes the voice of the caller, and so on, in which case the method proceeds to block 210. Alternatively, the user may decide to terminate the call, in which case the method proceeds to block 212.

In addition to the embodiments discussed above, the method of the present invention may further comprise generating a reporting message upon a failure to authenticate the identity of a caller and automatically forwarding the warning message to a further recipient such as a regulatory body or an authority to report this failure to allow the further recipient to take appropriate actions, e.g. track down the caller for further investigation and/or prosecution, prohibit the caller from making further spoof calls, and so on. To this end, the warning message may include the various caller authentication information provided by the caller to assist the further recipient in their investigations.

At this point it is noted that the various embodiments of the present invention are particularly suitable for confidential communications between a service provider and a client, where the service provider is seeking to contact the client, e.g. in the case of a financial service provider wishing to query a particular transaction of the client, e.g. a potentially fraudulent transaction on a debit or credit card. In such a scenario, the client receiving the call from the (financial) service provider can safely provide confidential information to the employee of the service provider as the embodiments of the method of the present invention provide the client with the reassurance that the identity of the caller has been authenticated.

Figure 4:
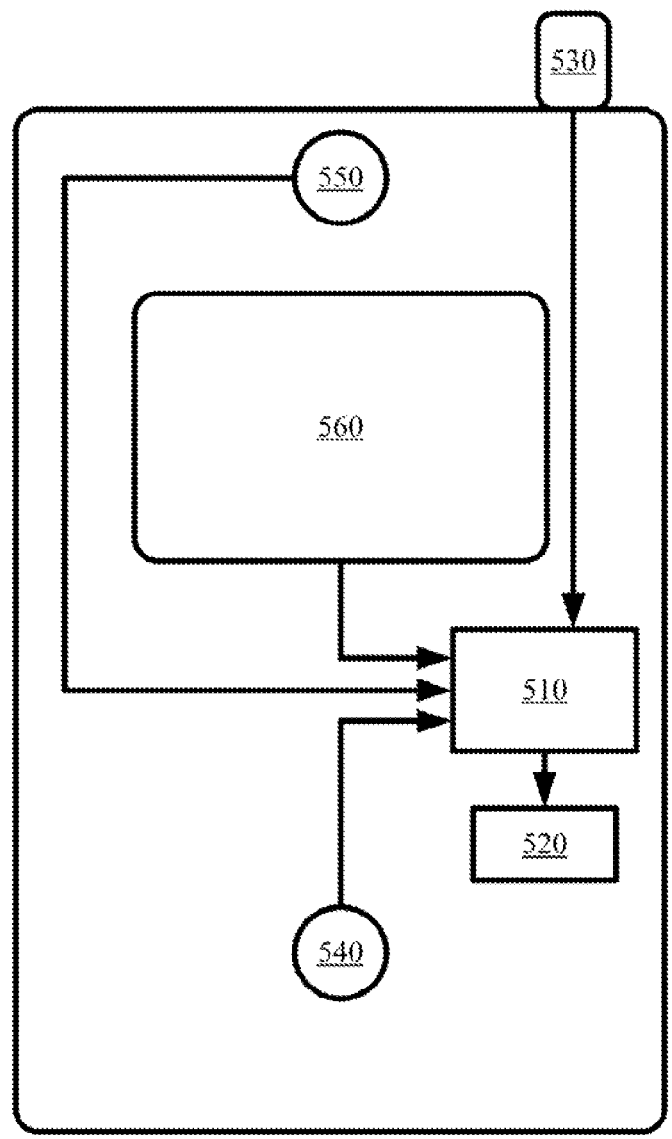
FIG. 4 schematically depicts an embodiment of a telephony device according to the claimed subject matter.

FIG. 4 schematically depicts a telephony device 500 adapted to implement one or more embodiments of the claimed subject matter. Telephony device 500 typically comprises at least one processor 510, a data carrier 520 including caller identification information, e.g. a SIM card comprising the phone number of the telephony device 500, an antenna 530 for transmitting and/or receiving a telephone call, a microphone 540, a loud speaker 550 and a display screen 560. The telephony device 500 may of course include additional components such as a key pad, a LED indicator, a camera, a scroll ball and so on.

In an embodiment, telephony device 500 is a caller device. In this embodiment, the processor 510 is adapted to encrypt the caller identification information from the data carrier 520 and to initiate a telephone call to a selected recipient of the call by generating a voice carrier signal including the caller identification information in unencrypted form and a data carrier signal including the caller identification information in encrypted form, e.g. comprised in a message sent through the data carrier signal. The voice carrier signal and the data carrier signal are typically transmitted simultaneously, e.g. through antenna 530, using a suitable communication standard. Non-limiting examples of such suitable standards are 3G and 4G. It is of course well-known per se to include caller identification information, e.g. a caller ID such as the phone number of the caller, as metadata in the voice carrier signal, such that this will not be explained in further detail for the sake of brevity. In this embodiment, the user of the telephony device 500 may use a private key to generate the encrypted caller identification information, with the recipient of the call being provided with a public key to enable the recipient to decrypt the encrypted caller identification information.

In an alternative embodiment, telephony device 500 is the recipient device. In this embodiment, processor 510 is adapted to simultaneously receive the voice carrier signal including the unencrypted caller identification information and the data carrier signal including the encrypted caller identification information to verify the identity of an unknown caller at the recipient device (as previously explained, verification of a known caller may be skipped). In an embodiment, processor 510 is adapted to verify the identity of an unknown caller by decrypting the encrypted caller identification information and verifying the authenticity of a certificate used to encrypt the caller identification information. In an alternative embodiment, processor 510 is adapted to verify the identity of an unknown caller by comparing the decrypted caller identification information with the caller identification information from the voice carrier signal. In yet another embodiment, processor 510 is adapted to first verify the authenticity of a certificate used to encrypt the caller identification information, and to subsequently compare the decrypted caller identification information with the caller identification information from the voice carrier signal if the certificate has been authenticated.

In an embodiment, processor 510 may be further adapted to automatically terminate the call if the identity of an unknown user cannot be authenticated. Alternatively, processor 510 may be further adapted to provide a user of the telephony device with said comparison result, e.g. in the form of a warning signal to inform the user that the identity of the caller could not be authenticated. Such a warning signal may take any suitable form, e.g. a change in ring tone, a warning sound generated on loud speaker 550, a visual warning sign such as a flashing LED, a warning message on display 560, a vibration through the casing of telephony device 500, and so on.

In an embodiment, processor 510 may be adapted to verify, i.e., authenticate, the identity of the caller prior to the recipient answering the call, in which case a warning signal may be generated to discourage the user from answering the call. In an alternative embodiment, processor 510 may be adapted to verify, i.e., authenticate, the identity of the caller after the recipient has answered the call, in which case a warning signal may be generated to encourage the user to terminate the call.

Processor 510 of recipient telephony device 500 may further be adapted to compare the caller identification information from the voice carrier signal against a list comprising the caller identification information of users known or familiar to the recipient, e.g. an address list. In this embodiment, processor 510 may skip the verification or authentication of the identity of the caller if it has been found that the caller identification information from the voice carrier signal matches caller identification information in said list.

It is noted that although telephony device 500 has been described in terms of a caller device and a recipient device, it should be understood that telephony device 500 may be able to act as a caller device as well as a recipient device, in which case processor 510 is adapted to encrypt caller identification information as well as to authenticate the identity of the initiator of an incoming call by decrypting the encrypted caller identification information and verifying the certificate used to encrypt the caller identification information and/or compare the decrypted caller identification information with the caller identification information in the voice carrier signal.

Telephony device 500 may be a mobile phone, e.g. a smart phone, which may be capable of communicating in accordance with the 3G or 4G communication standards, although it should be understood that the present invention is not limited to mobile telephony only.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A method of authenticating the identity of a caller in a telephone call between a caller device and a recipient device, the method comprising:
   receive a telephone call, initiated by a caller device and received at a recipient device, wherein the telephone call is provided by:
     encrypting caller identification information; and
     initiating the telephone call, said initiating comprising:
       providing a voice carrier signal including the caller identification information; and
       simultaneously providing a data carrier signal including the encrypted caller identification information;
   decrypting the encrypted caller identification information at the recipient device, and verifying the identity of at least an unknown caller at the recipient device by one of a list of verifying techniques, the list consisting of:
     verifying the authenticity of a certificate used to encrypt the caller identification information; and
     comparing the decrypted caller identification information with the caller identification information from the voice carrier signal.

2. The method of claim 1, further comprising venerating a warning message on the recipient device if the authenticity of the caller cannot be verified.

3. The method of claim 1, further comprising automatically terminating the call by the recipient device if the authenticity of the caller cannot, be verified.

4. The method of claim 1, further comprising decrypting the encrypted caller identification information using, a public key.

5. The method of claim 4, further comprising verifying the authenticity of a certificate used to encrypt the caller identification information in the recipient device prior to comparing the decrypted caller identification information with the caller identification information from the voice carrier signal at the recipient device.

6. The method of claim 1, wherein the comparing the decrypted caller identification information with the caller identification information from the voice carrier signal is performed prior to the call being answered by a user of the recipient device.

7. The method of claim 1, wherein the comparing, the decrypted caller identification information with the caller identification information from the voice carrier signal is performed after the call has been answered by a user of the recipient device.

\* \* \* \* \*